July 16, 1935.  L. P. BROWNE ET AL  2,008,488
CONTROL DEVICE FOR SLEDS
Filed April 3, 1934
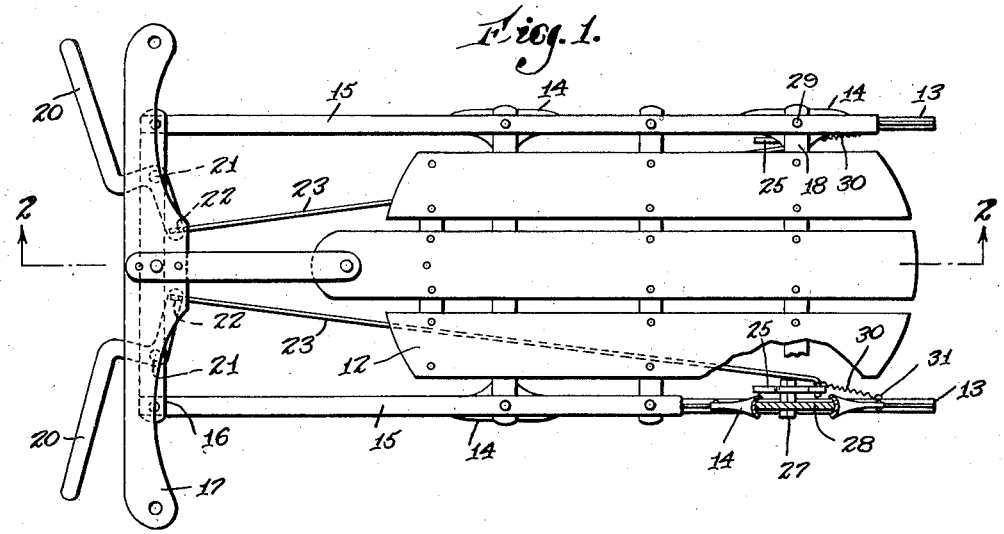
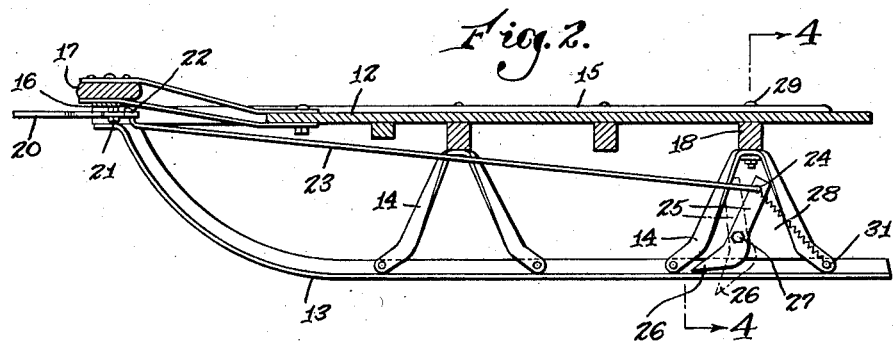
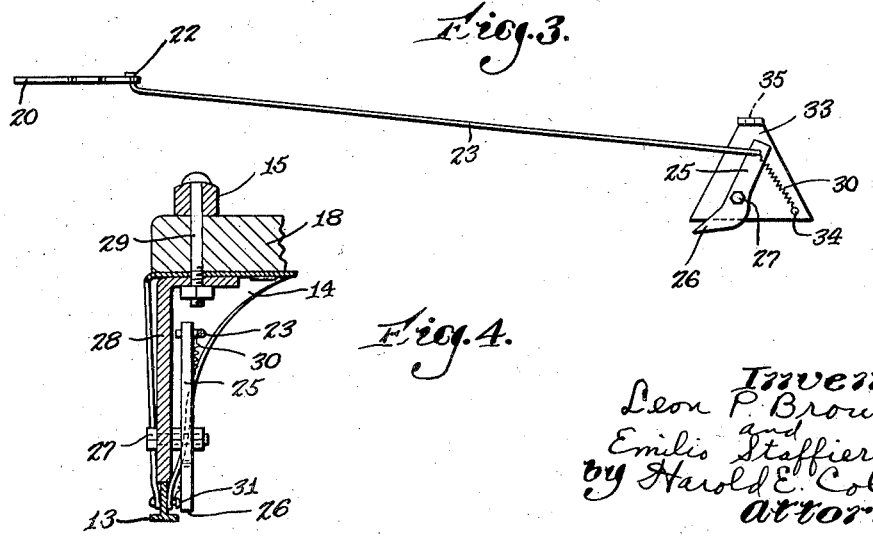
Inventors
Leon P. Browne
and
Emilio Staffieri
by Harold E. Cole
Attorney Patented July 16, 1935

2,008,488

UNITED STATES PATENT OFFICE 2,008,488

CONTROL DEVICE FOR SLEDS

Leon P. Browne and Emilio Staffieri, Everett, Mass.

Application April 3, 1934, Serial No. 718,775

3 Claims. (Cl. 188—8)

This invention relates to a control device for sleds and the like.

One object of our invention is to provide a device so positioned that it can be operated to stop a sled more quickly than anything heretofore invented.

Another object is to make the mechanism of said device so simple that its cost of manufacture is low.

Another object is to provide such a device that can be attached to sleds or the like already built.

Still another object is to make our device serve as a bumper as well.

We are aware that control devices and brake attachments for sleds have been made and tried before; but they were so located on the sled that they were a source of danger should the rider be thrown forward or sideways and strike them; whereas our device is so positioned that it is not a source of danger at all; but rather serves to alleviate the force of a collision, should there be one.

The foregoing and other objects which will appear as the nature of the invention is better understood, may be accomplished by a construction, combination and operative arrangement of parts such as is disclosed by the drawing. The nature of the invention is such as to render it susceptible to various changes and modifications, and, therefore, we are not to be limited to the construction disclosed by the drawing; but are entitled to all such changes therefrom as fall within the scope of our claims.

In the drawing:

Figure 1 is a plan view of a sled with a portion partly broken away to illustrate our control device attached thereto and in normal position.

Figure 2 is a section taken on the line 2—2 of Figure 1, particularly illustrating the actual braking mechanism, the dot and dash lines indicating the brake dog when in operative or braking position.

Figure 3 is a side elevation of our control device as a separate accessory, ready to be attached to a sled already built.

Figure 4 is a section taken on the line 4—4 of Figure 2, illustrating certain features of our control device in detail.

As illustrated, a sled 12 with runners 13 has the usual side or supporting brackets 14 and top side rails 15, and at the front has a cross support bar 16, above which is the steering bar 17 which is usually grasped by the hands of the operator or slider. Cross rails 18 extend below the top of the sled and strengthen it, said brackets 14 being fastened to them as shown.

Our control device has control levers 20 at the front of the sled which are below the top of the sled and project beyond said steering bar 17, the handle portions extending diagonally in a forward and sidewise direction beyond said steering bar 17 as shown in Figure 1 of the drawing. Each said lever 20 is independent of the other and connected to its own brake dog later described, and if only one lever is actuated said brake dog will serve to steer the sled as well as brake it. By having said levers 20 extend diagonally as shown there is always a space between them and said steering bar, so that the operator can always apply the brakes even when said steering bar 17 has been moved to a diagonal position in steering the sled. By positioning said levers 20 below the top frame of the sled the operator can readily actuate them by a mere movement of his fingers, and should he be thrown off the sled there is no danger of striking them, whereas when levers have been placed upright on a sled there is a danger of striking them, and to operate them the whole arm must change its position, thereby delaying the application of the brakes when time is very precious. As will be seen, these control levers 20 also serve as a bumper.

Said control levers 20 each are pivotally fastened as at 21 to said cross bar 16 which is stationary. At their inside end each lever 20 has a hole 22 through which one end of a tie rod 23 extends to fasten the two together. The opposite ends of these tie rods 23 extend through a hole 24 in the braking or control dogs 25, whereby they are fastened together, so that said tie rods directly connect said control levers 20 to said control dogs 25. At the outside end of said control dog 25 a tooth 26 is formed of special shape. It should be observed that the lower edge of said tooth starting from the pointed end extends straight until it reaches the curve forming the heel. By so forming this tooth 26 said dog 25 can be moved from normal position to braking position with the minimum of movement.

Said dog 25 is pivotally connected by a bolt 27 to a holding plate 28 which is attached to the sled by a bolt 29 which extends through one of said top side rails 15 and said cross rails 18. Said dog 25 is held in normal position by a tension spring 30 which is connected to said tie rod 23 adjacent to the point where said tie rod enters said hole 24. The other end of said spring 30 is fastened by a rivet 31 which extends through said runner 13 and bracket 14. The normal position of said dog 25 is shown in Figure 2 of the drawing, the dot and dash lines also showing its position when a lever 20 has been drawn towards the steering bar 17 to stop the sled or to steer it. Upon release of said lever 20 the spring 30 automatically returns said dog to normal position. Each lever 20 has its own dog 25 and connecting mechanism, and while they would usually be applied simultaneously, they could be applied individually, in which event the dog 25 would not only act as a brake on the sled, but would also steer it.

As above described our control device would be connected to the sled at the time the sled was manufactured; but we also provide a control device in combination with a holding plate whereby our device can be attached to a sled which is already completed. Said control device in the form of an accessory is illustrated in Figure 3 of the drawing, showing a separate holding plate 33 to which the spring 30 is directly attached as at 34. Said holding plate is inserted in the space in one of the side brackets 14 and the bolt 29 passes through the top rail 15 and cross rail 18 into the hole 35 in said holding plate 33, to thereby attach it to the sled. The other parts of our device are fastened to the sled as previously described. As so shown and described the device shown in Figure 3 of the drawing is a complete accessory which can be attached to a sled already built by a few simple operations.

What we claim is:

1. In a sled, a top structure, a runner structure, a brace between the top structure and the runner structure, said brace including a pair of opposedly channeled complementary members, a plate adapted to fit snugly within the brace with its edge portion disposed into the said channeled members, a movable dog on the plate adapted to be moved to a position projecting below the runner structure, and means for actuating the said dog.

2. In a sled, a top structure, a runner structure, a brace between the top structure and the runner structure, said brace being of substantially inverted V-shape, the leg portions of which are opposedly channeled, a plate adapted to fit snugly within the brace with its edge portions disposed into the channeled leg portions of the brace, a movable dog on the plate adapted to be moved to project below the runner structure, and means for actuating the said dog.

3. In a sled, a top structure, a runner structure, a brace between the top structure and the runner structure, said brace including a pair of opposedly channeled complementary members, a plate adapted to fit snugly within the brace with its edge portion disposed into the said channeled members, a movable dog on the plate adapted to be moved to a position projecting below the runner structure, and means for actuating the said dog, the upper portion of the said plate being provided with a laterally disposed lug and means for attaching the said lug to the said top structure.

LEON P. BROWNE.
EMILIO STAFFIERI.